United States Patent

Davis et al.

[11] Patent Number: 5,888,602
[45] Date of Patent: *Mar. 30, 1999

[54] ADHESIVE TAPE COMPOSITIONS

[75] Inventors: James A. Davis, Indianapolis; Chester T. Chmiel, Granger; Brian S. Alexander, Sheridan, all of Ind.

[73] Assignee: Bridgestone/Firestone, Inc., Akron, Ohio

[ * ] Notice: The term of this patent shall not extend beyond the expiration date of Pat. No. 5,545,685.

[21] Appl. No.: 772,345

[22] Filed: Aug. 14, 1996

Related U.S. Application Data

[62] Division of Ser. No. 214,511, Mar. 18, 1994, Pat. No. 5,563,217.

[51] Int. Cl.$^6$ ............................................. B32B 7/12
[52] U.S. Cl. .................. 428/40.1; 52/746.11; 428/57; 428/323; 428/330; 428/331; 428/500; 525/240; 525/194
[58] Field of Search ........................... 428/57, 40.1, 323, 428/330, 331, 500; 52/746.11; 525/240, 194

[56] References Cited

U.S. PATENT DOCUMENTS

| | | | |
|---|---|---|---|
| 3,307,690 | 3/1967 | Bond et al. ........................ | 206/59 |
| 3,657,203 | 4/1972 | Tarney et al. ..................... | 524/255 |
| 3,725,330 | 4/1973 | Shirato et al. .................... | 525/211 |
| 4,379,114 | 4/1983 | Fujiki et al. ...................... | 264/248 |
| 4,404,056 | 9/1983 | Kakehi et al. .................... | 156/244.11 |
| 4,426,468 | 1/1984 | Ornum et al. .................... | 523/166 |
| 4,539,344 | 9/1985 | Van Ornum et al. .............. | 523/166 |
| 4,581,092 | 4/1986 | Westley ............................. | 156/306.9 |
| 4,588,637 | 5/1986 | Chiu .................................. | 428/355 |
| 4,601,935 | 7/1986 | Metcalf et al. .................... | 428/57 |
| 4,855,172 | 8/1989 | Chiu .................................. | 428/57 |
| 4,936,071 | 6/1990 | Karrfalt ............................. | 52/428 |
| 5,000,361 | 3/1991 | Briddell et al. ................... | 222/575 |
| 5,095,068 | 3/1992 | Chiu .................................. | 524/525 |
| 5,242,727 | 9/1993 | Briddell et al. ................... | 428/42 |
| 5,242,971 | 9/1993 | Nakahama et al. ............... | 575/211 |
| 5,512,118 | 4/1996 | Davis ................................. | 428/57 |
| 5,545,685 | 8/1996 | Davis ................................. | 428/57 |
| 5,563,217 | 10/1996 | Davis ............................... | 525/194 |
| 5,612,141 | 3/1997 | Davis ................................. | 428/515 |

FOREIGN PATENT DOCUMENTS

| | | |
|---|---|---|
| 0 212 970 | 4/1987 | European Pat. Off. . |
| 0 258 984 | 9/1988 | European Pat. Off. . |

OTHER PUBLICATIONS

"RTV Adhesive System Based on Ethylene–Propylene–Diene Terpolymer," *Adhesive Age*, Jun. 1974, by Stephen E. Cantor.

*Primary Examiner*—Nasser Ahmad
*Attorney, Agent, or Firm*—Frank J. Troy, Sr.

[57] ABSTRACT

Flat rubber sheets are joined together at their primed surfaces utilizing an adhesive tape composition which features at least one EPDM rubber and will provide a long-term, water-tight barrier. The adhesive tape composition is a solventless, preformed, tacky composition comprising a) at least one crosslinkable EPDM rubber, b) a filler, either of the reinforcing or semi-reinforcing variety, c) one or more compatible tackifiers, d) a softener, and lastly, e) a cure system for the rubbery polymer. The tape composition itself has excellent ozone, moisture, weathering and heat aging resistance as well as superior low temperature properties.

17 Claims, 1 Drawing Sheet

ADHESIVE TAPE COMPOSITIONS

CROSS-REFERENCE

This application is a division of U.S. patent application Ser. No. 08/214,511, filed Mar. 18, 1994, of James A. Davis, Chester T. Chmiel, and Brian S. Alexander, for "Adhesive Tape Compositions," now U.S. Pat. No. 5,563,217, issued Oct. 8, 1996.

FIELD OF INVENTION

This invention generally relates to joining or adhering together flat rubber sheets using a solventless, preformed, tacky EPDM (ethylene-propylene-diene terpolymer) rubber adhesive tape composition. More particularly, a solid, tacky tape comprised of at least one EPDM rubber is provided for seaming the overlapped edges of reinforced or unreinforced flat rubber sheets comprising EPDM, EPR or other similar olefin-type polymers.

BACKGROUND

Roofing materials for covering large buildings are customarily available in sheets having a length up to several hundred feet and a width of from about three feet to about 50 feet. During installation, the roofing membranes are generally primed at their overlapped edges, before being joined together using an adhesive composition to form a weather-impermeable sealing barrier. In the past, solvent-based adhesives (neoprene and butyl-based) have been used to bond flat rubber sheets together. However, these adhesives have limited storage-life, and are highly toxic and flammable. The application of solvent-based adhesives via paint brushes often leaves streaks or coatings of uneven thickness and are known to reduce bond strength between the adhesive and the rubber sheeting. Also, solvents are environmentally undesirable and subject to increasing governmental regulation. Preformed adhesive tapes are generally preferred because they require less time and skill to install and eliminate the risk of exposure to hazardous, volatile, organic solvents generally found in solvent-based adhesives.

Efforts have been made in the art to develop better adhesive tapes which may be easier to apply to the overlapped edges of the rubber substrate, and which provide a long term capability to withstand moisture and heat aging. For example, Streets, U.S. Pat. No. 4,640,730, teaches the use of a styrene-butadiene block copolymer mixed with a hydrocarbon resin as a tape adhesive for bonding together EPDM and butyl rubber based flat rubber roof sheeting. Additionally, other attempts have been made in the art to develop adhesive tapes which may be easier to install and provide a long term water-tight barrier. For instance, Chiu, U.S. Pat. Nos. 4,588,637, 4,855,172 and 5,095,068, teaches a roofing adhesive tape utilizing butyl rubber compositions made by incorporating carbon black, a plasticizer, one or more tackifying resins and at least one curing agent in a blend of butyl rubber elastomers. The butyl-based tapes described by Chiu require additional fabrication steps involving precuring of the rubbery composition prior to application of the tape. U.S. Pat. No. 4,601,935 issued to Metcalf et al., disclosed an elastomeric polymer-based adhesive seaming tape comprising a carbon black reinforced lightly cured blend of butyl rubber and polyisobutylene.

Kakehi, U.S. Pat. No. 4,404,056, teaches a cold vulcanizable adhesive tape having a Mooney viscosity of from about 5 to 25 which includes one or more rubbery polymers, a vulcanizing agent, a vulcanization accelerator, an adhesive agent and a softening agent. The tape is positioned between overlapping sheets of unprimed flat roof sheeting, and the sheets are pressed together with a roller or the like. Other patents related to the use of tape compositions include, for example, Callan, U.S. Pat. No. 3,976,530, which discloses the use of blends of crosslinkable butyl rubber and polyisobutylene. The curing ingredients were incorporated in the non-crosslinkable polymer in order to prevent a premature reaction between the vulcanizing agent and the crosslinkable butyl rubber (two-component polymer tape) prior to extrusion of the tape product. Other patents include U.S. Pat. Nos. 4,379,114 to Fujuki et al., and 4,581,092 to Westley each mentioning the use of uncured, preformed, adhesive seaming tape compositions which contain EPDM, butyl rubbers, and mixtures thereof.

Such uncured, but curable, seaming tape compositions generally fall into one of three categories: (1) those containing fast-acting, cold-vulcanizable cure systems, (2) those containing heat-activated cure systems, and (3) those containing slow reacting, cold-vulcanizable cure systems. In the case of the seaming tape adhesive compositions having fast-reacting, cold-vulcanizable cure systems, it is generally necessary to blend and extrude the composition on-site and immediately thereafter apply the extruded adhesive tape composition to the roofing membranes which are to be joined together in order to prevent premature curing which can adversely affect the adhesive properties of such compositions. The seaming adhesive tape compositions containing heat-activated cure systems have the obvious disadvantage of requiring additional on-site apparatus and steps to thermally initiate the cure process. For the adhesive seaming tapes having slow acting, cold-vulcanizable cure systems, it is possible to preform the tape off-site and then install the tape to join roofing membranes without requiring additional equipment or steps to thermally initiate and propagate the cure. However, such slow-curing adhesive compositions do not generally exhibit good initial adhesion, and can take several days or even weeks to achieve good adhesion, particularly if they are used in cold weather.

However, the need still remains in the art for effective adhesive tape compositions and methods of application for use in adhering together the primed overlapped seams of flat rubber sheets which provides not only ease of application and good seam strength, but also wherein a suitable bond is formed between the primed overlapped edges of two flat rubber sheets.

SUMMARY OF THE INVENTION

It is an object of the present invention to provide a preformed elastomeric polymer-based adhesive tape composition which is particularly adaptable for use as an adhesive tape for joining together cured or uncured flat rubber roof sheeting materials, either unreinforced or fabric-reinforced.

It is yet another object of the present invention, to laminate a solventless, preformed elastomeric, polymer-based adhesive tape to uncured or cured flat rubber sheets, and uncured or cured flashing to form laminates for covering exposed batten bar strips, which are used to secure the flat rubber sheets on the roof of a building.

It is still another object of the present invention to provide a thin film as described above which can be used to form, a seam of variable width and hence strength between two or more flat rubber sheets.

The foregoing objects are achieved by the present invention which relates to an adhesive tape composition containing substantial amounts of at least one EPDM terpolymer. The adhesive tape composition can be used in adhering together flat rubber sheets of roofing materials to provide for high levels of peel adhesion and seam shear strength as well as static or dead-load shear strength.

The preformed adhesive tape is soft, deformable and tacky, yet has excellent initial green strength at 23° C. In accordance with a preferred aspect of the present invention, the adhesive composition includes substantial amounts by weight of an EPDM terpolymer having a molecular weight of from about 50,000 to about 250,000, lesser amounts of an EPDM terpolymer having a molecular weight of from about 10,000 to about 30,000, and a compatible tackifying resin. The tape composition also typically contains a liquid tackifier (polybutene polymer), a softener (paraffinic process oil), zinc oxide, stearic acid and a minor portion of carbon black or finely ground coal filler as well as other conventional non-black or mineral fillers. The cure system used to crosslink the blend of EPDM terpolymers preferably contains an oxidant or co-curative such as lead dioxide which reacts with p-quinone dioxime (QDO) to provide for sulfurless vulcanization. For convenience, the adhesive tape composition of the present invention may be fabricated in the form of an extruded tape, wound in a roll on a release paper liner. The preformed adhesive tapes are preferably about two to five-inches wide and about 20 to 60 mils in thickness.

The adhesive tape compositions of the present invention have excellent low temperature properties compared to neoprene and butyl rubber. Samples of these tapes did not become brittle when exposed to temperatures as low as –58° C.

Other advantages of the invention include improved long-term oxidative and ozone aging performance as well as improved heat aging resistance compared to conventional butyl based tape compositions. Tapes of this invention also can be effectively installed at lower temperatures than conventional butyl based tape. Also, storage stability (shelf-life) and green strength properties are comparable to or better than those of preformed, commercially available adhesive tapes.

DETAILED DESCRIPTION OF THE PREFERRED EMBODIMENT

Figure 1:
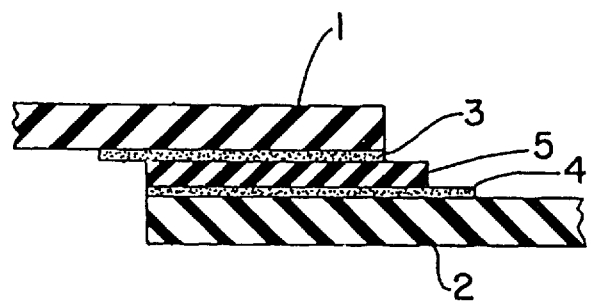
FIG. 1 is a vertical cross-section of two overlapping single ply flat rubber sheets which are joined together to form a seam in accordance with the present invention; and, FIG. 2 is a vertical cross-section of a rubber sheet which has been mated with the adhesive tape composition to form a laminate of this invention.

In FIG. 1 there are shown flat rubber roofing membranes 1 and 2. Each rubber membrane contains primer 3 and 4 deposited from solution and air-dried on the surface of the outer edges of the membrane. Adhesive tape 5 is a preformed, precured, tacky composition in accordance with the invention containing at least one EPDM rubber which is used to adhere the flat rubber membranes 1 and 2 to each other at the seam.

Figure 2:
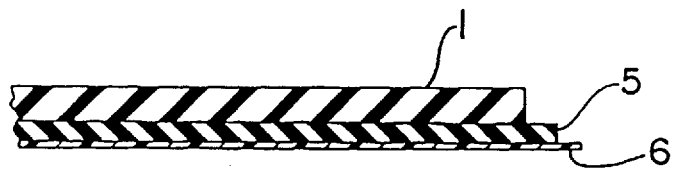

In FIG. 2 there is shown a clean, uncured or cured, flat rubber sheet or flashing 1. Adhesive tape 5 is a preformed, precured, tacky composition containing at least one EPDM rubber which is joined to the clean surface of the flat rubber membrane or flashing 1 to form a laminate which is used as a cover strip to cover the batten bar during the installation of a new roof or the repair of an existing roof. A release paper 6 is joined to the other tacky adhesive surface of the tape to prevent exposure of the surface to dust and other foreign materials prior to installation on a roof.

The EPDM rubbers suitable for use with the invention generally have a relatively low ethylene content as from about 45 percent to about 65 percent by weight, and more preferably from about 50 percent to about 65 percent by weight. The diene content of the EPDM rubbers suitable for use with this invention is from about 2 percent by weight to about 12 percent by weight, and more preferably from about 3 percent by weight to about 10 percent by weight. The EPDM rubbers suitable for use with the invention generally have a relatively low glass transition temperature such as from about –40° C. to about –60° C., and more preferably from about –45° C. to about –55° C. The adhesive compositions of the invention can contain a single EPDM rubber or a blend of two or more EPDM rubbers. When a single EPDM rubber is used, it should preferably have a relatively high weight average molecular weight as from about 50,000 to about 250,000. When a blend of two or more EPDM rubbers is used, at least one of the EPDM rubbers should have a relatively low weight average molecular weight, such as, from about 10,000 to about 30,000, an ethylene content of from about 45 to about 65 percent, more preferably from about 50 to about 60 percent, by weight, and a diene content of from about 2 to about 10 percent by weight. The EPDM rubber blends which are particularly preferred in the practice of the invention are comprised of at least 50 percent, and more preferably at least 75 or 80 percent by weight of one or more EPDM rubbers having a weight average molecular weight of from about 50,000 to about 250,000 based on the total amount of all EPDM rubbers in the blend, with the balance being one or more EPDM rubbers having a relatively low weight average molecular weight as from about 10,000 to about 30,000. That is to say the ratio of higher molecular weight EPDM (weight average molecular weight of 50,000 to 250,000) to lower molecular weight EPDM (weight average molecular weight of 10,000 to 30,000) is desirably at least 1:1, and more preferably at least 3:1 or 4:1 on a weight basis.

As noted, the adhesive tape composition used in the present invention comprises at least one EPDM rubber. The term EPDM is used in the sense of its definition as found in ASTM D-1418-85 and is intended to mean a terpolymer of ethylene, propylene and a diene monomer with the residual unsaturation portion of the diene in the side chain. Illustrative methods for preparing such terpolymers are found in U.S. Pat. No. 3,280,082, the disclosure of which is incorporated herein by reference.

Methods for making EPDM rubbers are also described, for example, by "Rubber Chemistry & Technology," Vol. 45, No. 1, March, 1972, Division of Rubber Chemistry, Incorporated, American Chemical Society, Pages 709–881; *Rubber Technology*, 2nd Edition, Morton, Van Nostrand Reinhold Company, New York, 1973, Chapter 9; *Polymer Chemistry of Synthetic Elastomers*, Part II, High Polymers Series, Volume 23, John Wiley & Sons, Inc., New York, 1969, Chapter 7; *Encyclopedia of Polymer Science and Technology*, Interscience Publishers, a Division of John Wiley & Sons, Inc., New York, Volume 6, (1967), pgs. 367–8 and Volume 5 (1966), pg. 494; and *Synthetic Rubber Manual*, International Institute of Synthetic Rubber Producers, Inc., 8th Edt., 1980.

The diene monomer utilized in forming the EPDM terpolymer is preferably a non-conjugated diene. The diene component of the EPDM rubber can be any of those typically used in commercially available EPDM rubbers including ethylidene norbornene, 1-4-hexadiene or dicyclopentadiene, with ethylidene norbornene being preferred. Other examples of non-conjugated dienes which may be employed are alkyldicyclopentadiene, 1,4-pentadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5(2-methyl-2-butenyl)-2-norbornene and the like. A typical EPDM is Royalene® 535 (Uniroyal Chemical Company), a terpolymer having a Mooney viscosity (ML/4 at 100° C.) of about 53; an ethylene content of 57–58 weight percent and about 9.5 weight percent unsaturation and a weight average molecular weight of about 181,000 as determined by gel permeation chromatography (GPC) and no crystallinity as determined using a Differential Scanning Calorimeter (DSC).

Particularly useful and preferred in preparing an adhesive tape composition is Royalene® 580 HT (Uniroyal Chemical Company) which has a Mooney viscosity (ML/4 at 125° C.) of about 39; an ethylene content of 52 weight percent and about 2.50 weight percent unsaturation, with the balance of the polymer being propylene. Another useful EPDM rubber is Royalene® 521, having a Mooney viscosity (ML/4 at 125° C.) of about 29; an ethylene content of about 51 weight percent and about 5 weight percent unsaturation, with the balance of the polymer being propylene. Also, particularly useful in preparing an EPDM tape composition is Royalene® 306 (Uniroyal Chemical Company) which has a Mooney viscosity (ML/4 at 125° C.) of about 60; an ethylene content of about 52 weight percent and about 3 weight percent unsaturation, with the balance of the polymer being propylene.

The EPDM rubbers used in the practice of this invention preferably are highly amorphous or non-crystalline to provide for better processability (higher filler and softener incorporation) and flexibility (less nervy). Highly amorphous EPDM rubbers are also preferred because they are generally tackier than the more crystalline EPDM rubbers. Generally speaking, EPDM's having less than 2 weight percent crystallinity as determined by DSC technique are considered as being amorphous or non-crystalline. Blends of amorphous and crystalline (having more than about two weight percent crystallinity) can also be used in the practice of this invention. Crystalline EPDM rubbers that can be blended with amorphous EPDM rubbers include Royalene® 512 which has a Mooney viscosity (ML/4 at 125° C.) of about 57; an ethylene content of about 67–68 weight percent and about 4 weight percent unsaturation and about 4–5 weight percent crystallinity with the balance of the polymer being propylene. Another particularly useful crystalline EPDM rubber that can be blended with an amorphous EPDM rubber is Royalene® 539, having a Mooney viscosity (ML/4 at 125° C.) of about 71; an ethylene content of about 73–74 weight percent, and about 5 weight percent unsaturation and nominally about 4–4.5 weight percent crystallinity as determined by DSC.

Trilene® liquid polymers are a family of viscous ethylene-propylene-nonconjugated diene terpolymer rubbers developed by Uniroyal Chemical Company. They are polymerized randomly to produce liquid rubbers with stable, saturated hydrocarbon backbones. The terpolymers derive their reactivity from pendant unsaturation. Trilene® liquid polymers can be used alone or in conjunction with solid rubbers in both thermosetting and thermoelastic applications. They can be cured like conventional rubber, yet have the broad application and processing versatility of liquids. Particularly useful and preferred in preparing an EPDM tape composition is Trilene® 67, which has an ethylene content of about 58 weight percent, a glass transition temperature of about −45.6° C., about 9.0 weight percent unsaturation and a number average molecular weight of 14,150, a weight average molecular weight of about 21,300, and a polydispersity of about 1.51. Also, Trilene® 68 which has an ethylene content of about 53 weight percent, a glass transition temperature of about −50.6° C., about 3 weight percent unsaturation, a number average molecular weight of 15,200, a weight average molecular weight of 24,725, and a polydispersity of about 1.63, may have utility in the tape compositions of this invention.

The rubbery components of the adhesive composition of this invention preferably consist primarily or exclusively of EPDM-type rubbers. However, small amounts of other rubber components, suitable as tackifiers, processing aids, softeners, etc., such as natural rubber, depolymerized natural rubber, styrene-butadiene rubbers, polybutadiene rubbers, polyisoprene rubbers, butyl and halobutyl rubbers, copolymers of ethylene with propylene, butene, and octene and the like, can be used in amounts which do not adversely affect the properties of the adhesive composition such as initial and long-term adhesion, heat aged resistance, weathering and ozone resistance, etc. The rubbery components utilized in the adhesive compositions of the invention are typically comprised of at least 90 percent EPDM rubber, and more preferably 95 to 100 percent by weight EPDM rubber.

The composition employed to form the adhesive tape is generally comprised of at least one EPDM rubber to which are added fillers, liquid and solid tackifiers, processing aids, and softeners as well as optionally other components including curatives or vulcanizing agents, all of which are discussed hereinbelow. The amounts of fillers, tackifiers, processing aids, curing agents and other additives used will generally be expressed throughout the specification as parts by weight per 100 parts by weight of EPDM rubber contained in the compositions and will be designated "phr".

The adhesive tape compositions of the invention are compounded with one or more known liquid, semi-solid, or solid tackifiers which are typically used to promote good tackiness in adhesive compositions. In general, any tackifying agent or combination of tackifying agents which are compatible with EPDM rubber may be used. Examples of suitable tackifying agents generally include polybutadienes, polyisoprenes, paraffinic oils, petrolatum, phthalates, various resins including polyterpenes, terpene-phenolic, modified rosin and rosin esters, and hydrocarbon resins. Resin as used herein refers to a variety of hard, brittle, solid or semi-solid organic substances. Resins may be either natural, i.e., rosin, or synthetic, i.e., coumarone-indene and phenol-formaldehyde. Rosin is basically a residue obtained from extracting pine wood chips with naphtha and distilling off the volatile fraction. Preferred tackifiers include hydrocarbon and phenolic resins.

Other tackifying substances which are preferably included in the adhesive tape composition include low molecular weight materials such as a hydrogenated petroleum-derived hydrocarbon resin (e.g., "Escorez® 5300"). "Escorez® 5300" is a colorless, thermoplastic, hydrogenated hydrocarbon that has outstanding resistance to oxidation and to discoloration caused by heat and aging, an average softening point of 105° C., a weight average molecular weight of about 440, a specific gravity at 23° C. of 1.05 and is commercially available from Exxon Chemical Company. Other noteworthy tackifying resins include Piccopale® 100 (a polyterpene resin) and Piccotac B® resin, both commercially available from Hercules, Incorporated. Piccopale 100® is a pale yellow, thermoplastic resin, having a softening point of about 100° C., an acid number of <1, and a specific gravity at 23° C. of 0.948.

Other tackifying/plasticizing ingredients which can be utilized in the practice of this invention include polybutenes commercially available under the trade name of Indopol® from Amoco Chemical Corporation. Polybutenes are a series of colorless isobutylene-butene copolymers composed predominantly of high molecular weight mono-olefins (95–100%), the balance being isoparaffins. They are chemically. stable, permanently-fluid liquids with moderate to high viscosity, resistant to oxidation by light and heat. An important characteristic is tackiness, which increases with increased molecular weight. The amount of liquid polybutene which can be utilized can vary from about 5 to as high as 100 parts per 100 phr, with a range of 15 to 40 or 50 phr being preferred. Some of the liquid polybutenes used to practice this invention include, Indopol® H-100, H-300, H-1500, and H-1900. A preferred polybutane is Indopol® H-300, which has an average molecular weight of about 1290, a pour point of about 1.7° C. and a specific gravity of 0.8984.

Other known commercially available plasticizing or tackifying organic materials can be used to obtain essentially the same results. Suitable tackifiers and the amounts thereof needed to achieve the desired level of tack can be readily determined by those skilled in the art using reasonable and routine experimentation.

Tackifying agents and/or plasticizing agent are generally used in amounts which are effective to promote good adhesion with EPDM and/or neoprene-type roofing membranes. Such effective combined amounts of tackifying and/or plasticizing agents can be readily determined by those of ordinary skill in the art and generally range from about 10 parts by weight to about 125 parts by weight per 100 parts by weight of rubber (phr), and more preferably from about 25 to about 80 phr. Softeners or processing oils are generally included in the adhesive tape composition of this invention to improve the processing behavior thereof (i.e., to reduce mixing time and heat buildup, to increase the rate of tape formation, and to impart a smooth surface to the tape extrudate). Processing oil is included in an amount ranging from about 15 to about 85 phr, preferably in an amount ranging from about 20 to about 40 phr. A preferred processing oil is a paraffinic oil, e.g., "Sunpar® 2280" having a specific gravity of 0.892 and commercially available from the Sun Oil Company. Another paraffinic processing oil which can be used as a softener for this invention is "Sunpar® 150", which is characterized as having a flash point, Cleveland Open Cup (COC), of 260° C., an aniline point of about 119° C., a refractive index of 1.4795, a specific gravity of 0.896 at 16° C., and a weight average molecular weight of about 505. Another process oil which may have utility in this tape composition is a mixture of paraffinic and naphthenic oils identified as Tufflo® 6056, which is characterized as having a specific gravity of 0.8762 at 16° C., liquid viscosity at 38° C. of 505 SUS, flash point of 232° C. and a weight average molecular weight of about 550 and is commercially available from Lyondell Petrochemical Company, Houston, Tex. Other petroleum derived oils including naphthenic process oils can be used.

Fillers suitable for use with this invention include reinforcing and non-reinforcing materials, and mixtures thereof, as are customarily added to rubber. Such fillers are utilized in conventional amounts such as from about 5 to about 100 phr. Examples include such materials as carbon black, finely ground coal, calcium carbonate, clay, silica, magnesium silicate, cryogenically ground rubber and the like. Preferred fillers include carbon black and finely ground coal.

Carbon black is typically used in an amount of about 5 parts to about 50 phr, and preferably in an amount of about 5 to about 15 phr. Generally, any conventional, carbon black used in compounding rubber based adhesive formulations is suitable for use in the practice of this invention. Preferred carbon blacks include furnace blacks, such as GPF (general-purpose furnace), FEF (fine extrusion furnace) and SRF (semi-reinforcing furnace). Also, small amounts of a reinforcing carbon black, i.e., HAF (high-abrasion furnace) may have utility in this invention.

Ground coal in the form of a dry, finely divided black powder which is derived from a low volatile, bituminous coal can be used in the tape compositions of this invention. Such ground coal has a particle size ranging from a minimum of 0.26 microns to a maximum of 2.555 microns, with an average particle size of 0.69±0.46 microns as determined by measuring the dimensions of 50 particles, using Transmission Electron Microscopy (TEM). Ground coal produces an aqueous slurry having a pH of about 7.0 when tested in accordance with ASTM D-1512. A preferred finely ground coal, designated "Austin Black® 325", has a specific gravity of 1.22±0.03, an ash content of 4.58%, and a sulfur content of about 0.65 percent. "Austin Black® 325" is commercially available from Coal Fillers, Incorporated, P.0. Box 1063, Bluefield, Va. Such finely ground coal can be used in amounts ranging from about 5 to about 35 phr, with about 5 to about 20 phr being preferred.

In order to improve heat aging resistance, zinc oxide, sulfur, or a combination of zinc oxide and sulfur can be added to the adhesive tape compositions of this invention. Amounts of zinc oxide which are effective for imparting improved heat aging properties range upward from about 1 to about 20 phr. Amounts of sulfur which have been found to be effective for imparting improved heat aging characteristics range from about 0.5 to about 1 phr. In accordance with the preferred embodiments of the invention, zinc oxide, in amounts ranging from about 2 to about 10, and more preferably from about 3 to about 8 phr, is used as the sole anti-heat aging agent.

The adhesive tape compositions of this invention are preferably compounded with one or more curing agents S and subsequently heat aged for a period of time sufficient to effect partial crosslinking or curing of the composition prior to its use as a seaming tape, whereby substantially all of the curatives are consumed, while leaving residual unsaturation in the polymer. Curing of the EPDM rubbers used in the compositions of this invention can be effected by any of the well known curing systems, including sulfur and sulfur-donor curing systems, peroxide curing systems, and quinone-type curing systems. Particularly preferred are p-quinone dioxime or dibenzoylquinone dioxime and any of a variety of oxidizing agents (i.e., lead dioxide).

Most preferably, the curing system used in the adhesive tape compositions of this invention are the quinone-type or nitroso-type curing agents, which are non-sulfur vulcanizing agents typically used for crosslinking various synthetic elastomers. Examples of quinone-type curing agents include, p-quinone dioxime and dibenzoyl p-quinone dioxime, while the nitroso-type curing agents include, p-dinitrosobenzene and N-methyl-N,4-dinitrosoaniline. Lead dioxide is preferably used in conjunction with p-quinone dioxime (QDO) to crosslink the EPDM rubber of this invention. Lead dioxide can be used in an amount of from about 0.1 to about 2.0 phr, preferably in the amount of about 0.1 to about 1.5 phr, while the preferred amount of QDO is from about 0.3 to about 1.50 phr. In its active form, p-quinone dioxime is a dark gray colored powdery material having a specific gravity of about 1.40, a minimum decomposition temperature of about 223° C., and is commercially available from the Chemical Divisions of either Lord Corporation or Uniroyal Chemical Company.

Sulfur and sulfur-containing cure systems which can be used in the practice of the invention include those containing elemental sulfur along with any of the commonly used sulfur accelerators including n-cyclohexyl-2-benzothiazole sulfonamide, 2-mercaptobenzothiazole, 2,2' dibenzothiazyl disulfide, tetramethylthiuram disulfide, zinc dimethyldithiocarbamate, zinc dibutyldithiocarbamate, 4,4' dithiodimorpholine, dipentamethylenethiuram hexasulfide, tetramethylthiuram monosulfide, ferric dimethyldithiocarbamate, zinc-o,o-dibutylphosphorodithioate, zinc diethyldithiocarbamate, and the like.

Sulfur donor-type accelerators may be used in place of elemental sulfur or in conjunction with elemental sulfur if desired. Suitable amounts of sulfur and/or sulfur donor-type compounds can be readily determined by those of ordinary skill in the art and generally range from about 1 to about 3 phr. The amounts of sulfur vulcanization accelerator can also be readily determined by those of ordinary skill in the art and generally range. from about 2 to about 6 phr.

Partial crosslinking of the adhesive compositions of the invention can also be effected with conventional peroxide curing systems. Examples of suitable peroxides that can be used as curing agents or co-curing agents include alpha-cumyl hydroperoxide, methylethylketone peroxide, hydrogen peroxide, acetylacetone peroxide, t-butyl hydroperoxide, t-butyl peroxybenzoate, 2,5-bis(t-butyl peroxy)-2,5-dimethylhexene, lauryl peroxide, benzoyl peroxide, 2,4-dichlorobenzoyl peroxide, dibenzoyl peroxide, bis (p-monomethylene-benzoyl) peroxide, bis(p-nitrobenzoyl) peroxide, phenylacetyl peroxide, and the like. Suitable amounts of peroxide crosslinking agents can be readily determined by those having ordinary skill in the art and generally range from about 1 to about 6 phr.

Examples of inorganic peroxides which can be used as co-curing agents with p-quinone dioxime include lead peroxide, zinc peroxide, barium peroxide, copper peroxide, potassium peroxide, silver peroxide, sodium peroxide, calcium peroxide, metallic peroxyborates, peroxychromates, peroxydicarbonates, peroxydiphosphates, peroxydisulfates, peroxygermanates, peroxymolybdates, peroxynitrates, magnesium peroxide, sodium pyrophosphate peroxide, and the like.

Examples of polysulfide activators for the quinone-type co-curing agents include calcium polysulfide, sodium polysulfide, as well as organic polysulfides having the general formula R—(S)$_x$—R, wherein R is a hydrocarbon group and x is a number from 2–4. Examples of organic polysulfides are disclosed in U.S. Pat. No. 2,619,481.

Conventional radiation equipment and techniques can be employed in the practice of this invention. Suitable ionizing crosslinking promoters which can be used to develop a partially cured adhesive tape composition using a non-sulfur or non-quinone type crosslinking technique include: liquid high-vinyl 1,2-polybutadiene resins containing 90% 1,2-vinyl content; Sartomer SR-206 (ethylene glycol dimethacrylate); Di-Cup R (dicumyl peroxide, about 98% active); and Pental A (pentaerythritol resin prepared from tall oil). Preferably, these rubber chemical additives can be included in an amount of from about 1.5 to about 20 phr. Such rubber chemical additives should be compatible with the other ingredients in the adhesive tape composition and function to reduce the dosage of ionizing radiation needed to obtain the desired level of crosslinking.

The adhesive compositions of this invention can be prepared by conventional means using conventional rubber compounding equipment such as a Brabender, two-roll mill, Banbury or Sigma-blade mixer, at temperatures ranging from about 50° C. to about 150° C. The cure package (e.g., p-quinone dioxime/lead dioxide) is typically added near the end of the mixing process and at lower temperatures to prevent premature curing of the tape composition. The adhesive tape composition can then be formed into a tape using a conventional mixing extruder or other suitable extrusion equipment. The tape is generally in the form of a continuous strip having a preferred thickness of from 20 to 60 mils, however, tapes having a thickness of up to 250 mils may be useful. The desired width of the tape can range from about 1 to 5-inches, however, tapes having a width of as wide as 18 inches may have utility in this invention.

The adhesive compositions of the invention, after being extruded or otherwise preformed into suitable tape extrudates, are heat aged to effect partial crosslinking thereof. Heat aging is generally achieved by exposing the composition to elevated temperatures for a time sufficient to obtain the desired partial crosslinking, wherein the polymeric elastomer contains residual unsaturation after the curative has been consumed. Typically, the desired partial crosslinking can be achieved by heating the preferred adhesive tape compositions of the invention to temperatures ranging from about 50° C. to about 150° C. for periods of time ranging from about 2 hours to about 48 hours, and more preferably to temperatures of from about 68° C. to about 150° C. for periods of time from about 8 hours to about 36 hours. The tape is typically provided with a conventional release paper and wound into a roll for transportation and storage.

The adhesive tape composition is used in a conventional manner such as by interposing it between the overlapping edges of adjacent roofing membranes to form a conventional roofing lap seam. The overlapping edges of the roofing membranes can be cleaned and primed as desired. Typical solvents used for cleaning the edges of the roofing membrane include hexane, heptane, toluene or unleaded gasoline; however, cleaning with solvents is generally not required and should be avoided. A suitable primer for use with this invention is Firestone's "QuickPrime", which is based on a butyl rubber formulation incorporating a polyisocyanate compound. Peel adhesion, seam shear strength, and static or dead-load shear strength are maximized by priming the overlapped edges of the two flat rubber sheets prior to forming the seam.

A better understanding of the detailed aspects and advantages of this invention is provided by way of the following non-limiting, illustrative examples, wherein seams were formed by bonding together layers of cured black EPDM sheeting material and various adhesive tape compositions in accordance with the formulation set forth in Table 1. These seams were prepared (see Detailed Preparation of Peel and Shear Samples and Adhesion Test Procedure) and subjected to a static or dead-load shear strength test as well as both peel and shear adhesion tests, the results of which are provided in Tables 2 and 3. Parts and percentages of each ingredient are by weight, unless otherwise, indicated.

TABLE 1

Adhesive Tape Formulations

| Ingredients (Parts by Weight) | Tape Designation No. (Examples) | | | |
|---|---|---|---|---|
| | 1 | 2 | 3 | 4 |
| Royalene ® 535[a] | 80 | 80 | 80 | 80 |
| Trilene ® 67[b] | 20 | 20 | 20 | 20 |
| Austin black ® 325[c] | 5 | 5 | 5 | 5 |
| Zinc Oxide | 5 | 5 | 5 | 5 |
| Stearic acid | 1 | 1 | 1 | 1 |
| Sunpar ® 2280 process oil[d] | 30 | 30 | 30 | 30 |
| Escorez ® 5300 resin[e] | 30 | — | 30 | — |
| Piccopale ® 100 resin[f] | — | 30 | — | 30 |
| Indopol ® H-300[g] | 20 | 20 | 20 | 20 |
| Lead dioxide[h] | 0.70 | 0.70 | 1.50 | 1.50 |
| p-Quinone Dioxime (QDO)[i] | 0.35 | 0.35 | 0.75 | 0.75 |
| TOTAL | 192.05 | 192.05 | 193.25 | 193.25 |

DESCRIPTION OF THE ABOVE INGREDIENTS

[a] Royalene ® 535—Ethylene-propylene-diene terpolymer, 57–58% by wt. ethylene, 9.5% by wt. unsaturation, ML/4 at 100° C. of about 53.
[b] Trilene ® 67—Low molecular weight ethylene-propylene-diene terpolymer, 58% by wt. ethylene, 9.0% by wt. unsaturation, Mw of about 21,000 by GC.
[c] Austin black ® 325—Oil-treated (7% by weight of a paraffinic process oil), finely, ground bituminous coal filler having a specific gravity of about 1.22.
[d] Sunpar ® 2280 process oil—Paraffinic process oil, ASTM D2226, type 104B having a specific gravity of 0.892 at 15° C.
[e] Escorez ® 5300 resin—a thermoplastic, petroleum-derived hydrogenated resin, having a softening point of about 105° C. and a specific gravity of about 1.05.
[f] Piccopale ® 100 resin—a pale yellow, thermoplastic resin, having a softening point of about 100° C., an acid number of <1, and a specific gravity of about 0.95.
[g] Indopol ® H-300—a colorless, liquid isobutylene-butene copolymer, composed predominantly of high molecular weight mono-olefins (95–100%), the balance being isoparaffins.
[h] Lead dioxide ($PbO_2$)—95% active material (chocolate brown colored powder) having a specific gravity of 9.375 and commercially available from EM Science, a Division of EM Industries, Inc.
[i] p-quinone dioxime (QDO)—a non-sulfur vulcanizing agent, about 94% active material (dark gray powder) having a specific gravity of about 1.40.

Detailed Preparation of Peel and Shear Samples and Adhesion Test Procedure

The adhesive tape compositions set forth in Table 1 were compounded and compression molded (4–5 minutes at 100° C.) to form a 32–40 mil thick tape. The tape composition supplied with a conventional release paper on each side was partially cured at 100° C. for 24 hours before being subjected to adhesion testing. Peel and shear adhesion test samples were prepared according to the following procedure:

1. A 45 mil sheet (approximately 10 by 45-inches) of a sulfur cured conventional black EPDM membrane was positioned under a solvent recovery hood and generally scrubbed with a QuickSeam® Scrub Pad saturated with QuickPrime®. Using a QuickPrime® saturated QuickSeam® Scrub. Pad a number-of back-and-forth sweeps were completed in an effort to coat one side of the membrane.

2. The membrane was then allowed to set for thirty minutes at room temperature so that the solvents in the QuickPrime® could flash-off.

3. Specimens tested in the peel configuration were prepared as follows. After sufficient (30 minutes) air-drying time, the release paper was removed from one side of the tape and the exposed side of the tape was applied by hand to the surface of the primer-coated EPDM membrane. The dimensions of the seam tape were approximately 3 by 6-inches, while the measurements for the two pieces of primer-coated black EPDM membrane were 4 by 6-inches. Before removing the release paper from the other side of the adhesive tape composition, the tape was firmly rubbed by hand against the surface of the primer-coated EPDM membrane to ensure good contact. After one side of the tape was successfully mated to the primer-coated membrane, the release paper was removed from the other side of the tape and firmly secured by hand to a second piece of primer-coated EPDM membrane along the edge of the long dimension.

4. Specimens tested in the shear configuration were prepared as follows. After sufficient (30 minutes) air-drying time, the release paper was removed from one side of the tape and the exposed side of the tape was applied along the edge of the long dimension of a 3 by 6-inch sample of primer-coated EPDM membrane. The dimensions of the adhesive tape composition were 1 by 6-inches, while the measurements for the primer coated membrane were 3 by 6-inches. Before removing the release paper from the other side of the adhesive tape composition, the tape was firmly rubbed by hand against the surface of the primer-coated EPDM membrane to insure good contact. After one side of the tape was successfully mated to the primer-coated membrane, the release paper from the other side of the tape composition was removed and firmly secured by hand to a second piece of primer-coated EPDM membrane along the edge of the long dimension.

5. Test specimens prepared in the peel and shear configuration were individually mated by rolling a 2.75-inch wide, 15 lb. steel roller at least four times over the surface of the seam using a back and forth motion. The specimens (of both the peel and shear configuration) were allowed to set underneath a solvent recovery hood for an additional 30 minutes.

6. A clicker machine with a one-inch wide die was utilized to prepare a number of test specimens for both peel (90° peel) and shear (180° peel) adhesion testing. It should be noted that one-inch wide samples prepared in the shear configuration were also tested in the static dead-load shear strength test.

7. The one-inch wide specimens (either in the peel or shear configuration) were aged for 24-hours at either 23° C. or 70° C. prior to testing. The test samples aged at 70° C. were allowed to equilibrate at 23° C. for at least 30 minutes prior to testing. After aging, the one-inch wide specimens were tested at the rate (both crosshead and chart speed) of two-inches per minute using an adhesion test set forth in ASTM D-413 (machine method). Both peel and shear adhesion strength were measured at room temperature (i.e., 23° C.). The testing machine was a table model 4301 Instron Universal Tester (a testing machine of the constant rate-of-jaw separation type) equipped with suitable grips capable of clamping the specimens firmly, without slip-page.

8. Adhesion seam strength is defined as:

$$\text{Peel Adhesion Strength (lbs./inch)} = \frac{\text{Force (lbs.)}}{\text{Sample width (inch)}}$$

$$\text{Shear Adhesion Strength (lbs./square inch)} = \frac{\text{Force (lbs.)}}{\text{Sample contact area}}$$

A number of test specimens, both of the peel and shear configuration were tested using the above adhesion test procedure.

Adhesion test samples prepared from the adhesive tape compositions of Table 1 are listed in Examples (1–4) shown hereinbelow. Tables 2 and 3 show a comparison of room temperature peel and shear adhesion properties (Examples 1–4) obtained on test samples aged 24-hours at either 23° C. or 70° C.

The 45 mil cured black EPDM rubber roofing membrane used to prepare the adhesion test specimens were obtained from a single factory production run, while the QuickPrime® used to adhesively prime the surface of the cured black EPDM membrane was from the same production lot.

TABLE 2

PEEL ADHESION COMPARISON

| Example No. | Test Specimens Aged 24 hours at 23° C./Tested at 23° C. (Lbs./inch) | Type of Failure |
| --- | --- | --- |
| Control (liquid adhesive seamed)[a] | 3.3 | b |
| 1 | 4.8 | c |
| 2 | 5.2 | c |
| 3 | 5.0 | c |
| 4 | 4.0 | c |

| Example No. | Test Specimens Aged 24 hours at 70° C./Tested at 23° C. (Lbs./inch) | Type of Failure |
| --- | --- | --- |
| Control (liquid adhesive seamed)[a] | 3.8 | b |
| 1 | 10.0 | c |
| 2 | 7.2 | c |
| 3 | 6.3 | c |
| 4 | 4.6 | c |

[a] Unreinforced, unprimed, sulfur-cured conventional black EPDM membrane seamed with a liquid lap splice adhesive, Firestone's SA-1065.
b) Adhesive failure: Separation occurs between lap splice adhesive and black EPDM roofing membrane.
c) Adhesive failure: Separation occurs between the layer of primer and black EPDM roofing membrane.

TABLE 3

SHEAR ADHESION STUDY

| Example No. | Test Specimens Aged 24 hours at 23° C./Tested at 23° C. (lbs./square inch) | Type of Failure |
| --- | --- | --- |
| Control (liquid adhesive seamed)[a] | 17.0 | b |
| 1 | 20.0 | c |
| 2 | 32.0 | c |
| 3 | 18.5 | c |
| 4 | 12.0 | c |

| Example No. | Test Specimens Aged 24 hours at 70° C./Tested at 23° C. (lbs./square inch) | Type of Failure |
| --- | --- | --- |
| Control (liquid adhesive seamed)[a] | 19.5 | b |
| 1 | 26.0 | c |
| 2 | 19.6 | c |
| 3 | 19.0 | c |
| 4 | 25.0 | c |

[a] Unreinforced, unprimed, sulfur-cured conventional black EPDM membrane seamed with a liquid lap splice adhesive, Firestone's SA-1065.
b) Adhesive failure: Separation occurs between lap splice adhesive and black EPDM roofing membrane.
c) Adhesive failure: Separation occurs between the layer of primer and black EPDM roofing membrane.

The peel adhesion test value shown in Table 2 for the liquid adhesive-seamed control aged 24 hours at 23° C. and tested at 23° C. is 3.3 lbs./inch, and the seam shear strength value for the control shown in Table 3 using the same aging time and temperature is 17 lbs./square inch. The adhesive tape compositions of this invention (Examples 1–4) exhibited comparable or improved peel and shear adhesion values, except for Example 4 in Table 3, which showed a somewhat lower shear adhesion value. Adhesive failure occurs when the cohesive strength of the adhesive tape exceeds the adhesive bond strength between the layer of primer and the black EPDM membrane or in the case of the control, failure occurs between the lap splice adhesive and the unprimed surface of the flat rubber sheet. Adhesive tape compositions such as those shown in Table 1 will allow the formation of seams suitable for commercial use.

The peel adhesion test value shown in Table 2 for the liquid adhesive-seamed control aged 24 hours at 70° C. and tested at 23° C. is 3.8 lbs./inch, and the seam shear strength value shown in Table 3 using the same aging time and temperature is 19.5 lbs./square inch. Comparable or improved peel and shear adhesion values were obtained when Examples (1–4) of Table 1 were compared to the liquid adhesive-seamed control.

The static or dead-load shear strength test is useful for determining the strength of an adhesive tape interposed between the overlapped edges of two flat rubber sheets to form a suitable bond between the primed over-lapped edges of two flat rubber sheets (i.e., roofing membranes, pond liners, and the like) using the adhesive tape of this invention. The static or dead-load shear strength test was conducted to determine the creep resistance of the four adhesive tape compositions of Table 1.

The static or dead-load shear test samples were prepared using the shear configuration in accordance with this invention as depicted in FIG. 1, and one-inch wide shear adhesion test samples were prepared in accordance with the procedure described hereinabove in the Detailed Preparation of Peel and Shear Samples and Adhesion Test Procedure. Before placing the test specimens in the 70° C. forced air oven, both sides of the test sample were marked with a rubber marking pen at the seam step-off. This made it easier to note any slippage that occurred during the static dead-load shear strength test. After aging the one-inch wide test specimens for 30 minutes at room temperature, they (in duplicate) were suspended in a vertical position in a 70° C. forced air oven. A 300 gram (0.66 lb.) weight was applied to the unattached end of each dead-load shear test specimen. After 24 hours exposure at 70° C., the splice should not creep or slip more than ⅛ inch. Slippage of the seam in excess of ⅛ inch denotes a failure on this test. All of the tape compositions, namely Examples 1–4, of the present invention, and the liquid adhesive seamed control, passed the dead-load shear test by supporting the 300-gram load when held in a vertical position in the 70° C. forced air oven for a minimum of 24 hours without slippage or failure. Seams that pass the dead-load shear test are said to have good creep resistance.

TABLE 4

Adhesive Tape Formulations - Effect of Polymer Ethylene and Diene Content

| Tape Designation No. | 5 | 6 | 7 | 8 |
| --- | --- | --- | --- | --- |
| Royalene ® 3399 | 100 | — | — | — |
| Royalene ® 521 | — | 100 | — | — |
| Royalene ® 535 | — | — | 100 | — |
| Royalene ® 539 | — | — | — | 100 |
| Escorez ® 5300 resin | 30 | — | — | —> |
| Indopol ® H-300 | 20 | — | — | —> |
| Sunpar ® 2280 Process Oil | 30 | — | — | —> |
| Coal filler (7% oil) | 5 | — | — | —> |
| Zinc oxide | 5 | — | — | —> |
| Stearic acid | 1 | — | — | —> |
| Lead dioxide | 0.70 | — | — | —> |
| QDO | 0.35 | — | — | —> |
| TOTAL | 192.05 | — | — | —> |
| Polymer Ethylene Content, Wt. % | 58 | 51 | 57 | 74 |
| Polymer Unsaturation, Wt. % | 1.50 | 5 | 9.5 | 5 |
| Type of Unsaturation | ENB | — | — | —> |

TABLE 5

Peel Adhesion Comparison

| Example No. | Test Specimens Aged 24 hours at 23° C./Tested at 23° C. (lbs./inch) | Test Specimens Aged 24 hours at 70° C./Tested at 23° C. (lbs./inch) | Test Specimens Aged 24 hours at 70° C./Tested at 70° C. (lbs./inch) |
| --- | --- | --- | --- |
| 5 | 0.6$^d$ | 1.5$^d$ | 0.4$^d$ |
| 6 | 2.6$^e$ | 2.5$^e$ | 0.8$^e$ |
| 7 | 6.7$^e$ | 6.9$^e$ | 1.0$^e$ |

$^d$Adhesive Failure: Test failure occurs between adhesive tape and quick prime interface.
$^e$Adhesive Failure: Test failure occurs between the layer of quick prime and black EPDM membrane.

TABLE 6

Shear Adhesion Study

| Example No. | Test Specimens Aged 24 hours at 23° C./Tested at 23° C. (lbs./sq. inch) | Test Specimens Aged 24 hours at 70° C./Tested at 23° C. (lbs./sq. inch) | Test Specimens Aged 24 hours at 70° C./Tested at 70° C. (lbs./sq. inch) |
| --- | --- | --- | --- |
| 5 | 8$^d$ | 9$^d$ | 4$^d$ |
| 6 | 16$^e$ | 17$^e$ | 13$^e$ |
| 7 | 21$^e$ | 25$^e$ | 14$^e$ |

$^d$Adhesive Failure: Test failure occurs between adhesive tape and quick prime interface.
$^e$Adhesive Failure: Test failure occurs between the layer of quick prime and black EPDM membrane.

Effect of Polymer Ethylene and Diene Content

Additional test specimens were prepared for peel adhesion strength, shear adhesion strength, and dead-load shear testing in accordance with the procedures set forth above using tape formulations 5–8 as set forth in Table 4. The test specimens prepared using the formulation of Example 8 exhibited essentially no measurable adhesion upon being aged for 24 hours at 23° C. and at 70° C. and therefore could not be tested for peel adhesion strength, shear adhesion strength, or dead-load shear. Comparison of the tape formulation of Example 6 with that of Example 8 strongly suggests that EPDM elastomers, such as Royalene 539, having a high ethylene content, such as 74 percent by weight, are unsuitable for use with this invention. The specimens prepared utilizing the tape formulation of Example 5 failed the dead-load shear test, with failure occurring between the adhesive tape and the primed surface of the black EPDM roofing membrane. The specimens prepared using the tape formulations of Examples 6 and 7 each passed the dead-load shear test. The dead-load shear test samples were prepared using the shear configuration in accordance with the invention as depicted in FIG. 1, and one-inch wide shear adhesion test samples were prepared in accordance with the procedure described herein above in the Detailed Preparation of Peel and Shear Samples and Adhesion Test Procedure. Comparison of the formulations of Examples 5–7 in view of the dead-load shear testing suggests that EPDM elastomers, such as Royalene 3399, having a low unsaturation content, such as, about 1.5 weight percent are unsuitable for use with this invention. The peel adhesion testing and the shear adhesion testing results for Examples 5–7 shown in Tables 5 and 6, respectively provide further evidence suggesting that an EPDM rubber having a low diene content, such as, 1.5 percent by weight is unsuitable for use with this invention. The peel and shear adhesion test results in Tables 5 and 6 also suggest that EPDM rubbers such as Royalene 521 and Royalene 535, having ethylene contents of 51 percent and 57 percent by weight and unsaturation contents of 5 and 9.5 weight percent respectively, are suitable for use with this invention.

The present invention finds utility in, for example, the joining together of other rubber articles including protective liners, agricultural pond liners, fabric-reinforced liners and sheets of modified bitumen, and in the construction and building industry as a laminate for clean sheet and flashing and to secure other building accessories, i.e., walkway pads, T-joint covers, pipe boots, batten bars and cover strips, sheets of insulation, deck plates, and the like to the roof of a building.

The foregoing examples illustrate that EPDM-based adhesive tape compositions in accordance with the principles of this invention, are capable of forming high strength seam joints between the overlapping edges of two flat rubber sheets. Prior to application of the adhesive tape, the overlapped edges of the flat rubber sheets were primed with a solvent-based primer at least 30 minutes prior to formation of the seam. Application of the primer eliminates the need to wash or scrub the overlapped edges of the flat rubber sheets with unleaded gasoline or solvent prior to application of the preformed adhesive tape along the overlapped edges to form a seam. The primer itself provides a better adhesion surface for the tape, compared to applying the adhesive tape directly to an unwashed membrane surface. The adhesive tape composition of this invention can be used to produce seam joints exhibiting excellent peel adhesion and shear strengths, dead-load shear strength, weather resistance, moisture and heat aging resistance, and low temperature properties. It is to be understood that this invention is not limited to the specific types of adhesive tapes or flat EPDM rubber sheeting exemplified herein or by the disclosure of other typical EPDM or other olefin-type polymers provided herein, the examples being merely illustrative of the specific embodiments of this invention. Similarly, this invention is not limited to the particular fillers, tackifiers, processing aids, softeners and vulcanizing agents exemplified or the amounts thereof.

Thus, it is believed that any of the variables disclosed herein can readily be determined and controlled without departing from the scope of this invention herein disclosed and described. Moreover, the scope of this invention shall include all modifications and variations that fall within the scope of the attached claims.

What is claimed is:

1. A laminate seam comprising a pair of partially overlapping sheet materials bonded together by an adhesive tape composition, comprising:
    a first EPDM rubber having an ethylene content of from about 45 to about 58 percent by weight, a diene content of from about 2 to about 12 percent by weight, and a weight average molecular weight of from about 50,000 to about 250,000;
    a second EPDM rubber having an ethylene content of from about 45 to about 58 percent by weight, a diene content of from about 2 to about 10 percent by weight, and a weight average molecular weight of from about 10,000 to about 30,000, said percentages by weight being based on the total weight of the first EPDM rubber and the second EPDM rubber, respectively;
    from about 10 parts by weight to about 125 parts by weight of a liquid tackifying polybutene polymer or at least one plasticizing agent, or both, per 100 parts by weight of said EPDM rubbers; and
    a curing agent which is either a nitroso compound or an oxidizing agent of from about 0.1 to about 2.0 parts by weight with a co-curing agent of from about 0.3 to about 1.5 parts by weight of p-quinone dioxime, said weight being based on 100 parts by weight of said EPDM rubbers.

2. The laminate seam of claim 1, wherein the ratio of EPDM having a weight average molecular weight of from about 50,000 to about 250,000 to an EPDM having a weight average molecular weight of from about 10,000 to about 30,000 is at least about 1:1.

3. The laminate seam of claim 2, wherein EPDM rubber comprises at least about 95 percent by weight of the total of all rubber polymers contained in said composition.

4. The laminate seam of claim 3, further comprising:
    from about 5 to about 100 parts by weight of a filler selected from the group consisting of reinforcing and non-reinforcing materials and mixtures thereof per 100 parts by weight of said EPDM rubber; and
    from about 15 to about 85 parts by weight of a softener or processing oil per 100 parts by weight of said EPDM rubber.

5. The laminate seam of claim 1, further comprising:
    from about 5 to about 100 parts by weight of a filler selected from the group consisting of reinforcing and non-reinforcing materials and mixtures thereof per 100 parts by weight of said EPDM rubber;
    from about 15 to about 85 parts by weight of a softener or processing oil per 100 parts by weight of said EPDM rubber; and
    from about 5 to 100 parts by weight of a liquid tackifying polybutene polymer per 100 parts by weight of said EPDM rubber.

6. An adhesive tape composition as set forth in claim 1, wherein said oxidizing agent is lead dioxide.

7. A laminate seam comprising a pair of partially overlapping sheet materials bonded together by an adhesive tape composition, comprising:
    at least one EPDM rubber having an ethylene content of from about 45 to about 65 percent by weight and a diene content of from about 2 to about 12 percent by weight, said percentages by weight being based on the total weight of said rubber;
    from about 5 to about 100 parts by weight per 100 parts by weight of said EPDM rubber of a tackifying agent; and
    a curing agent for promoting adhesion with a rubber substrate, said curing agent comprising a nitroso compound or an oxidizing agent of from about 0.1 to about 2.0 parts by weight per 100 parts by weight of said EPDM rubber with a co-curing agent of from about 0.3 to about 1.5 parts by weight per 100 parts by weight of said EPDM rubber of p-quinone dioxime, said total amount of curing agent being such that said adhesive tape composition undergoes only partial crosslinking after heating the tape composition at a temperature of from about 50° C. to about 150° C. for about 2 hours to about 48 hours.

8. The laminate seam of claim 7, wherein said EPDM rubber has a glass transition temperature from about −60° C. to about −40° C.

9. The laminate seam of claim 8, wherein said EPDM rubber has a weight average molecular weight of from about 50,000 to about 250,000.

10. The laminate seam of claim 9, further comprising a second EPDM rubber having a weight average molecular weight of from about 10,000 to about 30,000, a diene content of from about 2 to about 10 percent by weight, and a glass transition temperature of from about −60° C. to about −40° C.

11. The laminate seam of claim 10, wherein the ratio of EPDM having a weight average molecular weight of from about 50,000 to about 250,000 to an EPDM having a weight average molecular weight of from about 10,000 to about 30,000 is at least about 1:1.

12. The laminate seam of claim 11, wherein EPDM rubber comprises at least about 95 percent by weight of the total of all rubber polymers contained in said composition.

13. The laminate seam of claim 12, wherein said EPDM rubber is less than 2 weight percent crystallinity.

14. An adhesive tape composition as set forth in claim 7, wherein said oxidizing agent is lead dioxide.

15. A laminate seam comprising a pair of partially overlapping sheet materials bonded together by an adhesive tape composition, comprising:

at least one EPDM rubber having an ethylene content of from about 45 to about 58 percent by weight and a diene content of from about 2 to about 12 percent by weight, said percentages by weight being based on the total weight of said EPDM rubber;

from about 5 to about 100 parts by weight of a liquid tackifying polybutene polymer per 100 parts by weight of said EPDM rubber; and a total amount of curing agent such that said adhesive tape composition undergoes only partial crosslinking after heating the tape composition at a temperature of from about 50° C. to about 150° C. for about 2 hours to about 48 hours, said curing agent comprising a nitroso compound or an oxidizing agent with a co-curing agent of p-quinone dioxime or dibenzoyl quinone dioxime.

16. The laminate seam of claim 15, wherein EPDM rubber comprises at least about 95 percent by weight of the total of all rubber polymers contained in said composition.

17. An adhesive tape composition as set forth in claim 15, wherein said oxidizing agent is lead dioxide.

* * * * *